Sept. 1, 1925.
C. LEHMAN
NUT LOCK
Filed Feb. 28, 1924.
1,552,322
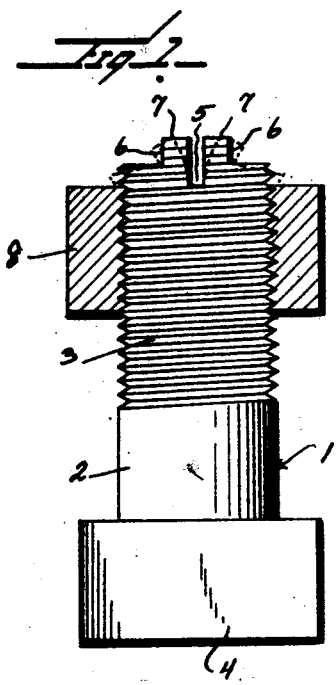
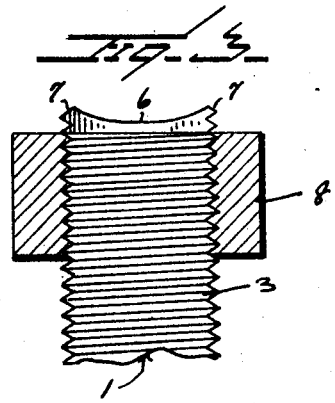
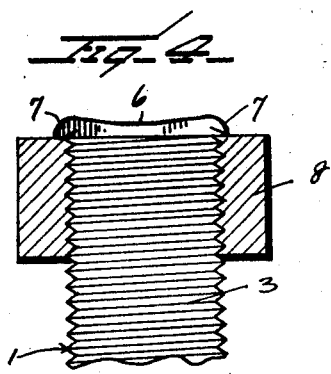
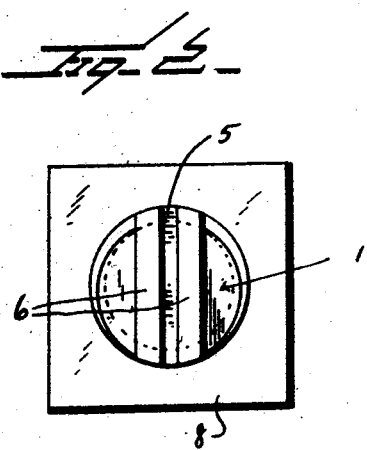
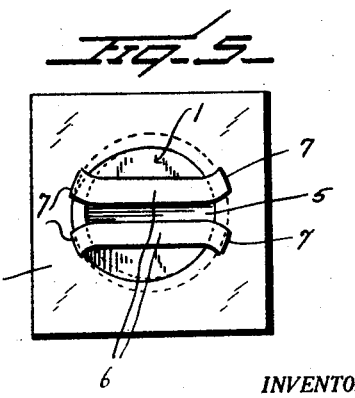
INVENTOR.
C. Lehman
BY Watson E. Coleman
ATTORNEY.

Patented Sept. 1, 1925.

1,552,322

UNITED STATES PATENT OFFICE.

CHARLES LEHMAN, OF GREENSBURG, PENNSYLVANIA.

NUT LOCK.

Application filed February 28, 1924. Serial No. 695,790.

*To all whom it may concern:*

Be it known that I, CHARLES LEHMAN, a citizen of the United States, residing at Greensburg, in the county of Westmoreland and State of Pennsylvania, have invented certain new and useful Improvements in Nut Locks, of which the following is a specification, reference being had to the accompanying drawings.

This invention relates to an improved nut lock and one object of the invention is to provide a device of this character in which, by slightly changing the construction of an ordinary threaded bolt, a nut of a conventional construction may be securely held upon the bolt and prevented from working loose.

Another object of the invention is to so construct the device that when desired the locking portion of the bolt may be readily brought back to its original condition so that a nut may be removed from the bolt.

Another object of the invention is to so construct the device that after a nut has been removed the nut may again be put in place and the locking means again deformed to prevent removal of the nut from the bolt thereby permitting the bolt and nut to be used as many times as desired.

Another object of the invention is to provide a construction of this character which will be very simple and which can be produced at a small cost and serve to secure the nut in a very effective manner.

This invention is illustrated in the accompanying drawings, wherein:—

Figure 1 is a sectional side elevation of a bolt and nut lock embodying the improvements of my invention;

Fig. 2 is an end view thereof;

Fig. 3 is a sectional view showing the device before the parts are locked together;

Fig. 4 is a similar view after the parts are locked,

Fig. 5 is an end view of the device with the parts illustrated in the same relation as in Fig. 4.

My nut lock includes a bolt which is indicated in general by the numeral 1 and provided with a shank 2 which is threaded, as shown at 3, a head 4 being provided at one end of the shank. The threads extend to the free end of the shank of this bolt and this free end portion of the shank is provided with a transversely extending slot 5 opening upon diametrically opposite faces of the shank. The side portions of the free end of the shank are removed in any desired manner thereby providing initially parallel ribs 6 at opposite sides of the groove or slot 5. It will be seen from the drawings that the ends of the ribs are formed with threads 7 precisely like the body of the bolt. It should be further noted that the side faces of these ribs are flat to provide shoulders and permit the ribs to be easily grasped between the jaws of a pair of pliers or struck by a chisel adjacent the ends of the ribs when it is desired to force the ribs towards each other in order to permit removal of the nut 8. This nut is of an ordinary construction and no change is made in order to permit of its being used. A bolt of an ordinary construction is also used but with the groove or slot 5 formed in its free end and the side portions of the free end of the bolt removed to provide the ribs 6.

When in use the shank of the bolt will be passed through the work and the nut will then be screwed upon the bolt in the usual manner until tightened the desired amount. A chisel or like implement is now to be disposed with its edge within the kerf or groove 5 at one or the other end of the groove and the chisel driven downward and toward the center of the bolt. This acts to spread apart the ends of the ribs and to deflect or deform the ends of the ribs, as illustrated in Figure 5, and this action tends to force the metal of the ribs beyond the periphery of the bolt and thereby in overlapping relation to the nut, as shown in Figure 5 clearly, thus preventing the nut from being removed from the bolt until the ribs, either by means of a chisel or by means of a pair of pliers, are again forced into the parallel relation shown in Figure 2. If the end portion of the bolt only extends partially into the nut the expanded ends of the ribs 6 will be forced into interlocking engagement with the threads of the nut and the nut will be firmly held against movement upon the bolt. Thus my nut lock may be used in connection with stud bolts where the bolt does not project beyond the nut but is held with its end either within the nut or terminating flush with the outer face of the nut. If the bolt has its reduced side portions terminating substantially flush with the outer end face of the nut the ribs, when spread and distorted, will have their expanded ends engaging over the outer end face of the nut. Since these end portions of the ribs extend in overlapping relation to the outer end face of the nut it will be impossible for the nut or bolt to come off. If the bolt extends through the nut to such an extent that it extends beyond the outer end of the nut the ribs, when spread and distorted, will serve to prevent removal of the nut from the bolt and if additional securing nuts are put in place upon the bolt until the end of the bolt is flush with the outer end of a nut or terminates within the depth of the nut, these securing nuts may be securely held in place. If it be desired to remove the nut from the bolt, it is simply necessary either to press the ribs into parallel relation by means of a pair of strong pliers or to strike the deformed ends of the ribs sharply with a chisel, which will bring the ribs back into parallel relation and permit the ready removal of the nut without any such deformation of the bolt itself as will prevent its re-use. It will be seen that when the ribs have their extremities initially spread apart, as shown in Figure 5, that the body of the bolt itself is held from any spreading so that the extremity of the bolt proper is not expanded at all but it is merely the extremities of the ribs 6 which are lengthened by deflection and forced out beyond the periphery of the bolt.

While I have illustrated the nut as applied to an ordinary bolt, it will be understood, of course, that the same locking principle may be used with a stud bolt. It is pointed out that the advantages of my invention reside in the fact that no change is made in the nut itself and that the deforming of the ribs of the bolt does not affect the nut itself in any way, and further that an ordinary bolt may be used simply modified as regards its extremity in the manner shown to provide the ribs 6 and that this bolt may be very cheaply made at only a very slight additional cost over the ordinary bolt, and that furthermore the bolt may be readily brought back to its initial condition when it is desired to remove the nut or the ribs may be as readily deflected and deformed when it is desired to hold the nut in place.

What is claimed is:—

The combination with a nut, of a bolt for engagement therethrough, said bolt having a threaded shank, one end of the shank being diametrically grooved, the groove opening upon the threaded face of the bolt at diametrically opposite points, the end face of the bolt on opposite sides of the groove being formed with two parallel ribs defining said groove, said ribs together being less in width than the diameter of the bolt, the ribs having a length equal to the full diameter of the bolt, said ribs being adapted to be deflected away from each other at their ends and thereby forced outward beyond the periphery of the bolt and after being so deflected returned to their initial positions to permit the removal of the nut by forcing the ends of the ribs inward by the use of an implement.

In testimony whereof I hereunto affix my signature.

CHARLES LEHMAN.